United States Patent [19]
Billeter

[11] 3,909,713
[45] Sept. 30, 1975

[54] DEVICE FOR MEASURING BIAXIAL STRAIN

[75] Inventor: Thomas R. Billeter, Richland, Wash.

[73] Assignee: The United States of America as represented by the United States Energy Research and Development Administration, Washington, D.C.

[22] Filed: Apr. 26, 1974

[21] Appl. No.: 464,427

[52] U.S. Cl.................................. 324/58.5 C; 73/89
[51] Int. Cl.² ............................................ G01R 1/04
[58] Field of Search........... 324/58.5 C, 58 C; 73/89

[56] References Cited
UNITED STATES PATENTS

| | | | |
|---|---|---|---|
| 3,400,330 | 9/1968 | Thompson, Jr. et al. | 324/58.5 C |
| 3,458,808 | 7/1969 | Agdur | 324/58.5 C |
| 3,581,190 | 5/1971 | Brown | 324/58.5 C X |
| 3,739,263 | 6/1973 | Henoch | 324/58.5 C |

Primary Examiner—Stanley T. Krawczewicz
Attorney, Agent, or Firm—Dean E. Carlson; Arthur A. Churm; Paul A. Gottlieb

[57] ABSTRACT

A device for measuring the biaxial strain of a test specimen is provided, utilizing a coaxial resonant cavity, made to resonate in at least two different modes by electromagnetic energy supplied to the cavity. A first mode is dependent upon the diametric dimensions of the cavity and a second mode is dependent upon the axial and diametric dimensions of the cavity. The cavity is formed of a hollow, sensor body whose electrically conductive inner walls, one of which is movable, function as the outer conductor of the coaxial cavity, and which is adapted to receive the test specimen through the movable wall which is rigidly coupled to the test specimen. The outer surface of the test specimen, being electrically conductive, functions as the inner conductor of the coaxial resonator. Dimensional variations in the test specimen result in a variation in the dimensions of the coaxial cavity and therefore in the frequency at which the cavity will resonate in each of the modes. These frequency variations can be monitored to provide a measure of biaxial strain associated with the object.

5 Claims, 6 Drawing Figures

U.S. Patent  Sept. 30,1975  Sheet 1 of 3  3,909,713

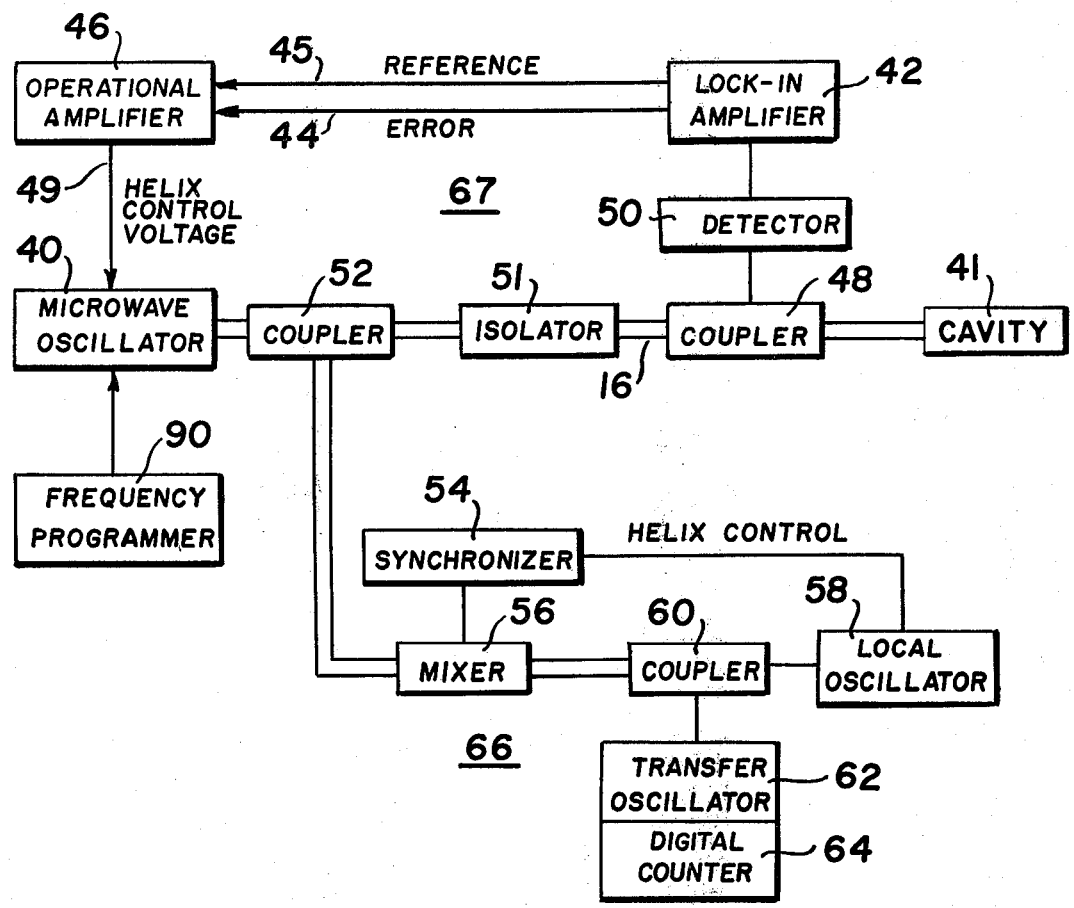

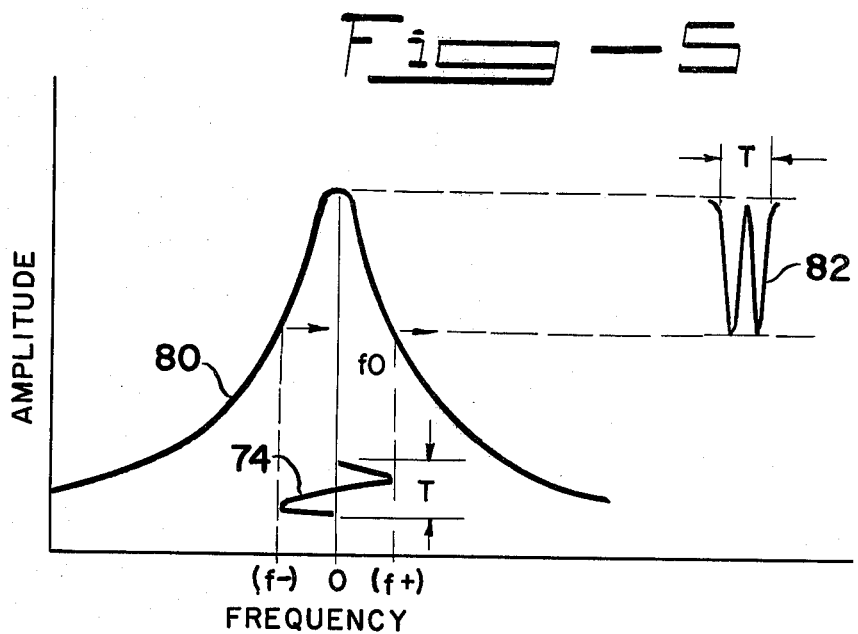
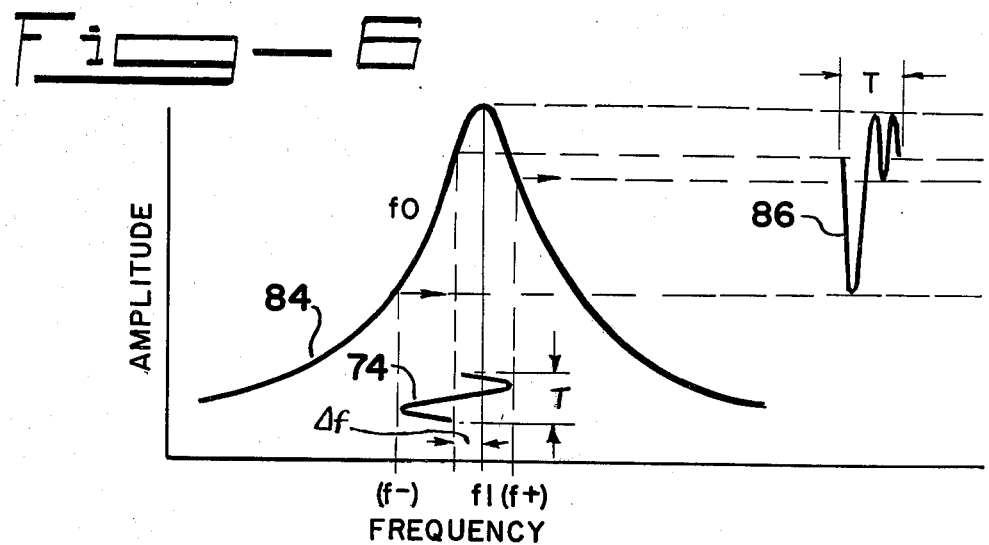

DEVICE FOR MEASURING BIAXIAL STRAIN

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Knowledge concerning the physical properties of materials necessarily includes an accurate description of the magnitude, rate, and the dependence upon causative effects of strain. All materials experience mechanical strain for an applied stress. Magnitude and rate of strain depend in part upon the environment of the material. In particular, material strain is affected by subjection to high temperatures and to gamma and neutron radiation. As materials within a nuclear reactor must remain for long periods of time in such an environment, it is desirable to have information regarding the response due to strain of the materials to be used in the reactor to facilitate reactor design.

Present means for measuring the material strain include mechanical means which employ use of comparative data taken before strain and after strain. Use of this method precludes continuous measurement of strain during the test. Consequently, required information concerning strain rate or transient creep characteristics are not obtained. Various pneumatic, electrical contact, or linear variable differential transformer methods of measuring strain have also been employed with limited success. Major problems with these measurement schemes relate to temperature-induced instabilities and errors. Extension rods used between the measured specimen and the strain-sensing device experience differential expansion, thereby introducing measurement error. The strain-sensing mechanism is often of complex mechanical design prone to malfunction for imposed severe temperature and radiation environments. In addition, most of the presently available methods of determining material strain information are limited to uniaxial deformations.

The need exists for biaxial strain measurement instrumentation, i.e. the relatively simultaneous monitoring in two directions of a test specimen for material strain. As an example, nuclear reactor fuel elements liberate fission gas during irradiation, and for unvented fuel pins, this gas causes a strain radial to the fuel cladding. Resulting strain growth must be accurately known for purposes of core containment design and also for reactivity calculations. Comparative measurements before and after irradiation yield minimal information about diametric expansion because internal stress varies as the specimen diameter expands.

It is therefore an object of this invention to provide a device for measuring biaxial strain.

Another object of this invention is to provide a device for measuring biaxial strain under severe environmental and radiation conditions.

SUMMARY OF THE INVENTION

Biaxial strain measurements of test specimens are achieved utilizing a coaxial resonant cavity of which the test specimen forms an active element. The coaxial cavity includes a hollow sensor body with one wall of the sensor body being movable. The inner walls of the sensor body are of metal and serve as the outer conductor of the coaxial cavity. The sensor body is adapted to receive the test specimen with the movable wall being rigidly attached to the test specimen. The outer surface of the test specimen must be electrically conductive in that it serves as the inner conductor of the coaxial cavity. The cavity is made to resonate at two different modes with the frequency of the first mode being dependent upon the diametric dimensions of the cavity, that is, the diametric changes in the test specimen. The frequency of the second mode is dependent upon both the diametric and axial dimensions of the test specimen forming the inner conductor. Strain-induced variations in the diameter of the test specimen result in a variation in the cavity size, and, therefore, in a corresponding variation in the frequency at which the first and second modes resonate. Likewise, strain-induced variation in the length of the test specimen accordingly changes the position of the movable wall of the cavity, changing the size of the cavity. This results in a corresponding variation in the frequency at which the second mode resonates. The variation in frequency for both modes may be monitored and, by application of known physical relationships between cavity dimension and mode frequency, the strain may be continuously measured.

BRIEF DESCRIPTION OF THE DRAWINGS

FIG. 4 is a schematic diagram of the biaxial strain-measuring system; and

FIGS. 5 and 6 are graphical illustrations of the device's response to dimensional changes.

DETAILED DESCRIPTION OF THE PREFERRED EMBODIMENT

Figure 1:
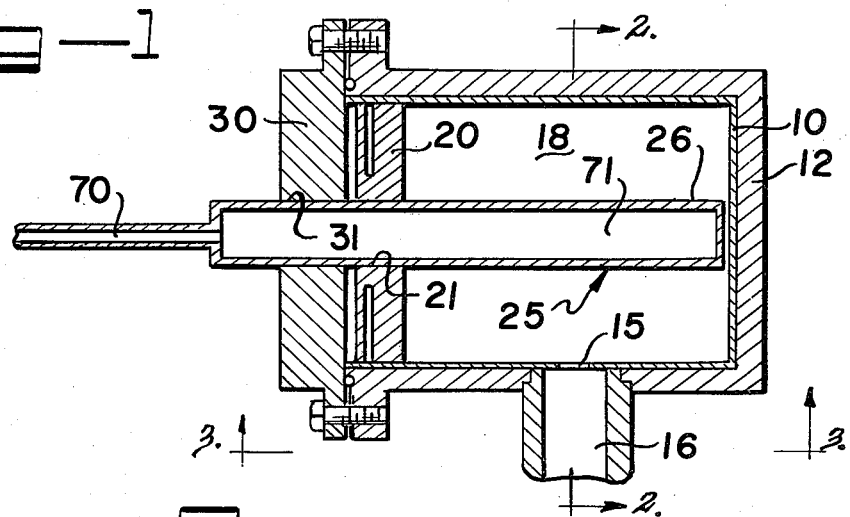
FIG. 1 is a sectional view of the biaxial measurement device cut along the axis of the inner conductor of the coaxial cavity.
Figure 2:
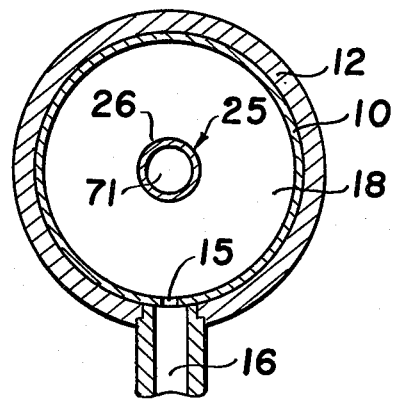
FIG. 2 is a cross-sectional view taken along the lines 2—2 of FIG. 1.
Figure 3:
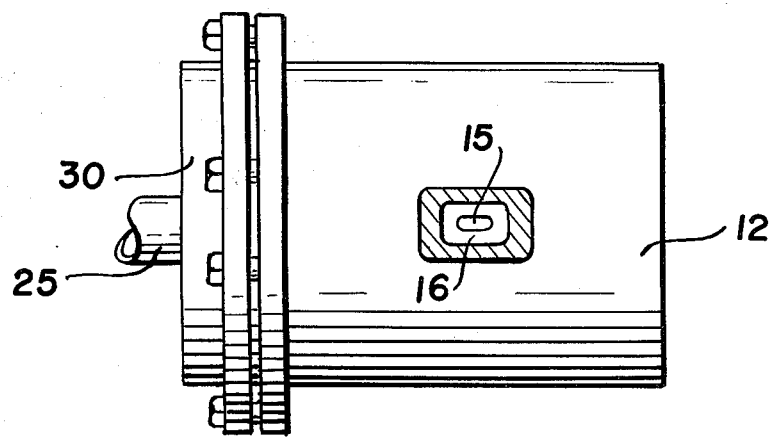
FIG. 3 is a cross-sectional view taken along lines 3—3 of FIG. 1.

The invention herein disclosed relates to the use of a coaxial resonant microwave cavity, such as shown in FIG. 1, FIG. 2 and FIG. 3, for the continuous measurement of biaxial material strain. As strain occurs and the material deforms, the size of the resonating coaxial cavity is made to vary correspondingly, thereby causing the frequency at which the sensor is resonating to change proportionally.

A better understanding of the capability of operation of the device can be had from the following theoretical explanation. The resonant frequency, $f$, of a coaxial cavity is defined with relation to other cavity characteristics by the fundamental equation:

$$(fD_o)^2 = \left(\frac{cX_{l,m}}{\pi}\right)^2 + \left(\frac{cn}{2}\right)^2 \left(\frac{D_o}{L}\right)^2$$

for $D_o$ and $L$, the diameter and length of the cylinder, $c$ the velocity of light in a vacuum, and $X_{l,m}$ the argument satisfying one of the following Bessel function equations:

$J_1(X) N_1(\eta X) + J_1(\eta X) N_1(X)$ (TM Modes)

$J_1'(X) N_1'(\eta X) = J_1'(\eta X) N_1'(X)$ (TE Modes)

where $\eta$ is a diameter ratio of the inner and outer coaxial conductors $D_i/D_o$. $l,m$ and $n$ are integer values commonly known as Eigen-values. For a coaxial resonator, the fundamental equation expresses a straight line dependence of $(fD_o)^2$ upon with an intercept of $$\left(\frac{D_o}{L}\right)^2,$$

and a slope of $$\left(\frac{c\ X_{1,m}}{\pi}\right)^2$$

$$\left(\frac{cn}{2}\right)^2.$$

the cylinder can resonate at a distinct frequency. A similar analysis applies to other geometries and this invention should not be considered as being limited to cylindrical coaxial cavities but any shape coaxial cavity will suffice.

The operating principle of the device resides in the change of the resonant frequency for variations of either diameter or length in the test specimen, as may be determined from the fundamental equation. Certain modes of resonance, e.g. for $n = 0$, operate at a frequency independent of variations in sensor length, whereas others, e.g. for $n$ greater than 0, yield increased sensitivity with length variations for each larger integer value of $n$. Since a cavity can resonate at more than one mode simultaneously, it is possible to simultaneously monitor two or more dimensional characteristics of the cavity by exciting the cavity in at least two modes, each mode dependent upon a parameter to be measured.

An example of a single cavity, biaxial measuring device in accordance with the invention herein disclosed is illustrated in FIG. 1, FIG. 2, and FIG. 3. The embodiment shown basically comprises a high-conductivity, copper inner cylinder 10, pressed into a stainless steel outer jacket 12. An outer stainless steel jacket is employed to increase the structural support in order to withstand a severe operating environment for which the measuring device may be adapted. Most high-conductivity metals suitable for transmitting microwave energies cannot withstand severe operating conditions without such additional structural support. Therefore, the high-conductivity metal is supported within the jacket and can be affixed thereto by any suitable means such as brazing. Only a thin continuous coating of high-conductivity metal is required for this purpose, so that any other method consistent with the desired characteristics of the coaxial cavity can be employed to achieve the cavity lining. A slot 15 is indicated in the circumferential surface of cylinder 10, as shown in FIG. 1 and in FIG. 3, for coupling microwave electromagnetic fields from the connecting wave guide 16 to the cavity. While two or more slots may be used for exciting two or more modes of resonance within the cavity, it should be understood that in practice one slot, properly designed, may be used to introduce at least two modes of resonance into the cavity. A piston 20 forms one end of cylinder 10 and includes an opening 21 through which the test specimen 25 may be introduced into cavity 18. Piston 20 is rigidly attached to test specimen 25 by means such as welding or brazing and should be of a material similar to that of the high-conductivity metal of the cylinder walls. Test specimen 25 is the object whose strain response is to be monitored biaxially. For the embodiment herein illustrated test specimen 25 should be of a generally cylindrical shape, having a high-conductivity metallic outer surface 26. Any test specimen 25 having a suitable outer surface 26 capable of supporting a resonance within cavity 18 may be tested by the device. For example, test specimen 25 may be a solid metal rod, a hollow metal rod, or a rod coated with a thin, metal outer layer. The device is provided with a cavity end cap 30 to provide sealing of the cavity from a severe environment in which the device may be employed. The cap should be of stainless steel or other suitable protective material and may be threadably connected to the outer body 12 of the device. The end cap 30 is provided with an opening 31 through which test specimen 25 may communicate with cavity 18. The cavity 18 connects via wave guide 16, which herein is shown as a rectangular wave guide but which may be of any appropriate shape, to external instruments shown schematically in FIG. 4. It should be noted that while the embodiment shown features a piston arrangement, any suitable means for varying cavity size in response to length changes such as a bellows is appropriate.

The cavity in this embodiment may be made to resonate in two modes under ambient conditions with both modes the same frequency or with each mode at its own frequency. Initially, the microwave oscillator 40 illustrated in FIG. 4 forms a source for the electromagnetic energy which is communicated to cavity 41 via wave guide 16. The microwave oscillator is tuned, by a built-in error signal, to initially sweep around the central resonant frequency or frequencies to excite cavity 41 to resonate. The resonant frequency of the modes will vary according to the length and diameter of the sensor cavity. Accordingly, the frequency of the reflected energy provided back through the wave guide will provide an indication of this variation of resonance frequency.

As is known in the art, almost complete absorption of the incident energy at the resonant frequency or frequencies of the cavity can be effected by proper design of the cavity. In particular, consider a coaxial cavity resonating in a first mode where $n = 0$ and the initial resonance frequency is $f_o$. As microwave oscillator 40 transmits energy of varying frequencies by sweeping about the resonant frequency $f_o$, departure from the resonant frequency of the cavity causes less and less of the energy incident to the cavity to be absorbed. The reflected energy can be sampled, for example, by the 20 DB coupler 48, which diverts a portion of the reflected energy to detector 50. Microwave coupler and detector combination 48 and 50 is a well-known piece of equipment in the art which provides an electrical signal output proportional to the energy of the sample reflected wave. This electrical output is then communicated to the lock-in amplifier 42 which provides an error signal output 44 representative of the frequency or frequencies of resonance of the device upon an approximate null in the detector output occurring at a deviation from the initial frequency $f_o$ of resonance of the cavity. At the same time, a built-in reference signal 45 is communicated by the lock-in amplifier to the operational amplifier 46, which sums the reference and error input and provides a helix control voltage output 49. Helix control 49 voltage further adjusts microwave oscillator 40 to scan around a center frequency corresponding to the new resonant frequency. An isolator 51 is provided within the wave guide 16 to prevent the reflected signal from being transmitted back to the microwave oscillator 40 and in essence functions as an electromagnetic diode. In addition, a second coupler 52, provided at the output of the microwave oscillator 40, diverts a portion of the transmitted energy to a sampling circuit 66 whcih records the frequency of the microwave oscillator on a digital counter 64. The components 54, 56, 58, and 60 translate the frequency at which microwave oscillator 40 is operating to a frequency compatible with the transfer oscillator 62, which is employed to drive digital counter 64. Thus, each time the microwave oscillator provides a sweep, the corresponding frequencies are recorded on the digital counter 64.

More specifically, referring to FIG. 5, it can be observed that as the microwave oscillator 40 communicates an incident energy wave 74 of period T, sweeping around the initial frequency of resonance of $f_o$ by a bandwidth extending from $f-$ to $f+$, the cavity's response will be as indicated by the graph illustrated by reference character 80 in FIG. 5. The reflected energy from the cavity will actually be proportional to the mirror image of the illustrated cavity's response due to the cavity's structural configuration which is designed to absorb more and more of the incident energy as the oscillator's sweep approaches the frequency or frequencies of resonance of the cavity. Accordingly, the output of the detector 50 will be proportional to the inverse of the wave form illustrated by reference character 82. Inasmuch as the detector's output response is of a much higher frequency than the incident energy wave, twice the frequency of the incident energy in this example, the lock-in amplifier 42, of designed narrow band width, will not provide an error output respnse 44. The reference output 45 will therefore continue to maintain the microwave oscillator sweep centered around $f_o$.

With a given monitored diametric expansion, the cavity's response will be as indicated by the graph illustrated by reference character 84 and the resonant frequency of the cavity will shift by $\Delta f$ to a new resonant frequency $f_i$, as illustrated in FIG. 6. However, the instantaneous microwave oscillator 40 sweep at the time of the diametric expansion will remain centered around $f_o$. The detector output in response to this expansion will communicate a signal having a large fundamental component inversely proportional to the wave form 86 shown in FIG. 6. The lock-in amplifier 42 will respond to the fundamental component of the detector output to provide a representative error signal which will be reflected in the helix control voltage to the oscillator 40. The new helix control voltage will tend to maintain the oscillator sweep centered around the new frequency of resonance of the cavity. As is known in the art, a slight deviation from the resonance will be encountered due to the inherent closed loop feedback response. However, this deviation is minimal and will not affect the operation of the system.

To simultaneously monitor the response of the material to axial strain as well as diametrical strain, a second resonant frequency is imposed on the cavity dependent upon the length "L" and the diameter ratio ($D_i/D_o$) simultaneous with the resonance previously described. Any expansion in the length of the test specimen causes a corresponding variation in the position of piston 20 which is rigidly coupled to test specimen 25. Since there is no mode according to the fundamental equation which is dependent upon "L" but not $D_i/D_o$, the frequency of the second mode will depend upon both "L" and $D_i/D_o$. Since the diametric expansion may be obtained from the first mode ($n = 0$), it is therefore possible to monitor the axial strain, the change in "L", simultaneous with the monitoring of the diametric strain.

To introduce and monitor two separate modes of resonance in the cavity simultaneously, one may either introduce two modes operating at the same frequency or introduce two separate frequencies into the cavity. It has been observed, however, that to simplify the instrumentation required to monitor cavity resonance without sacrificing the advantages of simultaneous monitoring of biaxial strain, the use of a separate frequency sweep for each mode is preferable, permitting the instrumentation to alternate between each mode. This alternation is controlled by frequency programmer 90, which consists merely of a resistive network in the form of a voltage divider employed to control the voltage level of the helix control voltage 48 and thereby to control the output frequency of the microwave oscillator 40. By external programming of frequency programmer 90, it can be made to force microwave oscillator 40 to switch back and forth between the two separate frequency sweeps to excite the cavity in each of two modes. The switching is fast enough that the necessary simultaneity is not lost. Simultaneity by introduction and simultaneous monitoring of each mode may be achieved by employing duplicate networks 66 and 67 for each mode.

Generally, as a specific example, a coaxial resonator, having a 0.231 inch stainless steel inner conductor test specimen, was operated at 37,500 MHz in the TM110 mode which varies according to diametric expansion and not length expansion and the TEO11 mode which varies according to both diametric and length expansion. The diametric strain was imposed on the test specimen by pressurizing it, via pressurizing tube 70 which allows the introduction of pressurizing gases into the interior 71 of test specimen 25, thereby causing diametric strain in test specimen 25. By using a mode of resonance which is solely dependent upon diametric expansion for this particular resonant frequency, it is possible to measure the strain associated with diametric expansion without reference to linear expansion. Linear expansion is examined using a second frequency mode which is imposed on the sensor alternately or simultaneously with the diametric mode. Note that the subscripts associated with the given notation representative of the transverse electric and magnetic modes refer to the $l, m$ and $n$ Eigen-values previously referred to. It was observed that, as the 0.231 inch stainless steel inner conductor was pressurized, the resonant frequency changed with a sensitivity of 102 MHz per $10^{-3}$ inches of diameter change.

It should be noted that use of the described strain measurement method in a nuclear radiation environment has particular advantages. Metals swell while subject to such radiation fields an exist in a nuclear reactor. In contrast to other strain methods, operational characteristics of the disclosed technique remain independent of swelling phenomena. For example, as linear dimensions undergo equal percentage of change from radiation-induced swelling, the ratio of linear dimensions remains unchanged. Consequently, as the ratios of inner to outer diameter and the length to diameter for a coaxial resonator remain independent of swelling effects, so also does the difference frequency between two resonant modes of the cavity. Therefore, if the material strain causes a variation of difference frequency between resonant modes, the strain measurement will be independent of swelling occurring in the metal cavity. Similar to cylindrical resonators, a coaxial resonator may also be operated in resonant modes nearly independent of the inner conductor length, their frequency dependent almost totally upon the diameter of the inner and outer coaxial structures.

Thus, this invention contemplates an apparatus for providing simultaneous and continuous measurement of biaxial strain utilizing a simple, all metal sensor incorporating a single resonant microwave coaxial cavity. An obvious area of application concerns the nuclear industry where the biaxial strain measurement device will reduce the danger of damage to strain sensors due to the harsh environment. The sensor and associated transmission lines are operable without degradation in very severe environments including high levels of fast and thermal neutron flux and gamma radiations, liquid sodium coolants, high temperatures as limited by the metals employed and pressures up to at least several hundred pounds per square inch. It should be understood that the described apparatus is not limited to reactor application or caustic environments, but can be employed in many other technology areas. Additionally, while the preferred embodiment was described employing cylindrical test specimens and a cylindrical sensor body, any coaxial design such as square within square is subject to the same conditions herein described except that different physical equations must be determined.

The embodiments of the invention in which an exclusive property or privilege is claimed are defined as follows:

1. A device for measuring the biaxial strain of a test specimen having an electrically conductive outer surface, comprising:
   a high-frequency electromagnetic energy source capable of transmitting energy,
   a hollow housing having electrically conductive inner walls, one of said inner walls being movable with respect to the other inner walls and having therethrough a hole, said test specimen being inserted through said hole and rigidly coupled to said movable wall to form a coaxial resonant cavity with the test specimen being the inner conductor and said inner walls of said housing being the outer conductor of said coaxial cavity, said coaxial cavity being of such dimensions that it has at least two resonant frequency modes with the frequency of the first of said resonant modes being dependent upon the length and radial dimension of said inner conductor and with the frequency of a second of said resonant modes being dependent upon the radial dimension of said inner conductor,
   means coupled to said coaxial cavity and said source for communicating thereto energy from said source to excite said cavity to resonate at said first and second resonant modes, and
   detection means coupled to said cavity and being responsive thereto to provide outputs representative of the frequencies at which the cavity is resonating in said first and second modes.

2. The device of claim 1 wherein said inner walls of said hollow housing form a cylinder, said movable wall being one end of said cylinder, and wherein said test specimen is cylindrical.

3. The device of claim 1 wherein said means for communicating transmits any energy reflected from said cavity, and wherein said detection means is coupled to said means for communicating and is responsive to said reflected energy to provide outputs representative of the frequencies at which the cavity is resonating in said first and second modes.

4. The device of claim 3 wherein said source is capable of transmitting energy having a frequency varying over a band width of frequency ranges, and said detection means being coupled to said source and being responsive to said reflected energy to vary said band width so that said band width of frequencies includes at least one of the frequencies at which said cavity is resonating in said first and second modes.

5. The device of claim 4 further including frequency programming means coupled to said source and capable of causing said source to alternate between transferring energy over a first band width of frequencies which include the resonant frequency of the first mode and the capability of transferring energy over a second band width which includes the resonant frequency of the second mode, said first band width not overlapping said second band width.

* * * * *

UNITED STATES PATENT OFFICE
CERTIFICATE OF CORRECTION

Patent No. 3,909,713　　　　　　　　　　　Dated September 30, 1975

Inventor(s) Thomas R. Billeter

It is certified that error appears in the above-identified patent and that said Letters Patent are hereby corrected as shown below:

Column 3, line 14, insert before "the cylinder"

--For each selected discrete combination of 1, m and n--.

Signed and Sealed this twentieth Day of April 1976

[SEAL]

Attest:

RUTH C. MASON
*Attesting Officer*

C. MARSHALL DANN
*Commissioner of Patents and Trademarks*